United States Patent
Torlo et al.

(10) Patent No.: US 8,401,731 B2
(45) Date of Patent: Mar. 19, 2013

(54) WORKSHOP SYSTEM WITH A PLURALITY OF DIAGNOSTIC AND/OR PROGRAMMING DEVICES NETWORKED BY DATA LINKS FOR VEHICLES

(75) Inventors: Marc Torlo, Munich (DE); Stefan Mueller, Haar-Gronsdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 626 days.

(21) Appl. No.: 12/371,382

(22) Filed: Feb. 13, 2009

(65) Prior Publication Data

US 2009/0204288 A1 Aug. 13, 2009

Related U.S. Application Data

(63) Continuation of application No. PCT/EP2007/006837, filed on Aug. 2, 2007.

(30) Foreign Application Priority Data

Aug. 17, 2006 (DE) .......................... 10 2006 038 425

(51) Int. Cl.
- G01M 17/00 (2006.01)
- G06F 7/00 (2006.01)
- G06F 17/00 (2006.01)
- G06F 11/30 (2006.01)
- G07C 5/00 (2006.01)

(52) U.S. Cl. .................... 701/31.4; 701/29.1; 701/29.3; 701/31.5; 701/34.3

(58) Field of Classification Search .................... 701/29, 701/33, 29.1, 29.3, 31.4, 31.5, 32.7, 33.2, 701/33.7, 33.8, 33.9, 34.3
See application file for complete search history.

(56) References Cited

U.S. PATENT DOCUMENTS

| | | | | |
|---|---|---|---|---|
| 4,924,391 A * | 5/1990 | Hirano et al. | .................... | 701/33 |
| 5,553,488 A | 9/1996 | Ishii et al. | | |
| 6,564,128 B2 * | 5/2003 | Baird et al. | ..................... | 701/33 |
| 6,757,521 B1 * | 6/2004 | Ying | .......................... | 455/67.11 |
| 2004/0133319 A1 | 7/2004 | Pillar et al. | | |
| 2005/0113991 A1 | 5/2005 | Rogers et al. | | |
| 2006/0142907 A1 * | 6/2006 | Cancilla et al. | ................. | 701/29 |
| 2007/0185624 A1 * | 8/2007 | Duddles et al. | .................... | 701/1 |
| 2007/0244611 A1 * | 10/2007 | Brozovich | ....................... | 701/29 |

FOREIGN PATENT DOCUMENTS

| | | |
|---|---|---|
| DE | 43 20 173 C2 | 12/1994 |
| DE | 101 57 578 A1 | 8/2003 |
| DE | 103 01 983 A1 | 7/2004 |
| DE | 10 2005 023 359 A1 | 11/2006 |
| EP | 1 476 816 B1 | 11/2004 |
| EP | 1 574 396 A2 | 9/2005 |
| EP | 1 659 731 A1 | 5/2006 |
| JP | 11-99891 A | 4/1999 |

OTHER PUBLICATIONS

International Search Report dated Nov. 30, 2007 with English translation (six (6) pages).
German Search Report dated Jan. 11, 2007 with English translation (Nine (9) pages).

* cited by examiner

Primary Examiner — Thomas Tarcza
Assistant Examiner — Rami Khatib
(74) Attorney, Agent, or Firm — Crowell & Moring LLP

(57) ABSTRACT

A workshop system, with a plurality of diagnostic and/or programming devices, which are networked by means of data links and are intended for vehicles is provided. In order to enhance the reliability of workshop systems of the prior art, a warning indicating the occurrence of an event, which requires that a workshop employee intervene at a moment's notice at a first diagnostic and/or programming device of the networked devices is forwarded, as an alternative or in addition, to a second or an additional diagnostic and/or programming device to be communicated to the workshop employee.

11 Claims, 1 Drawing Sheet

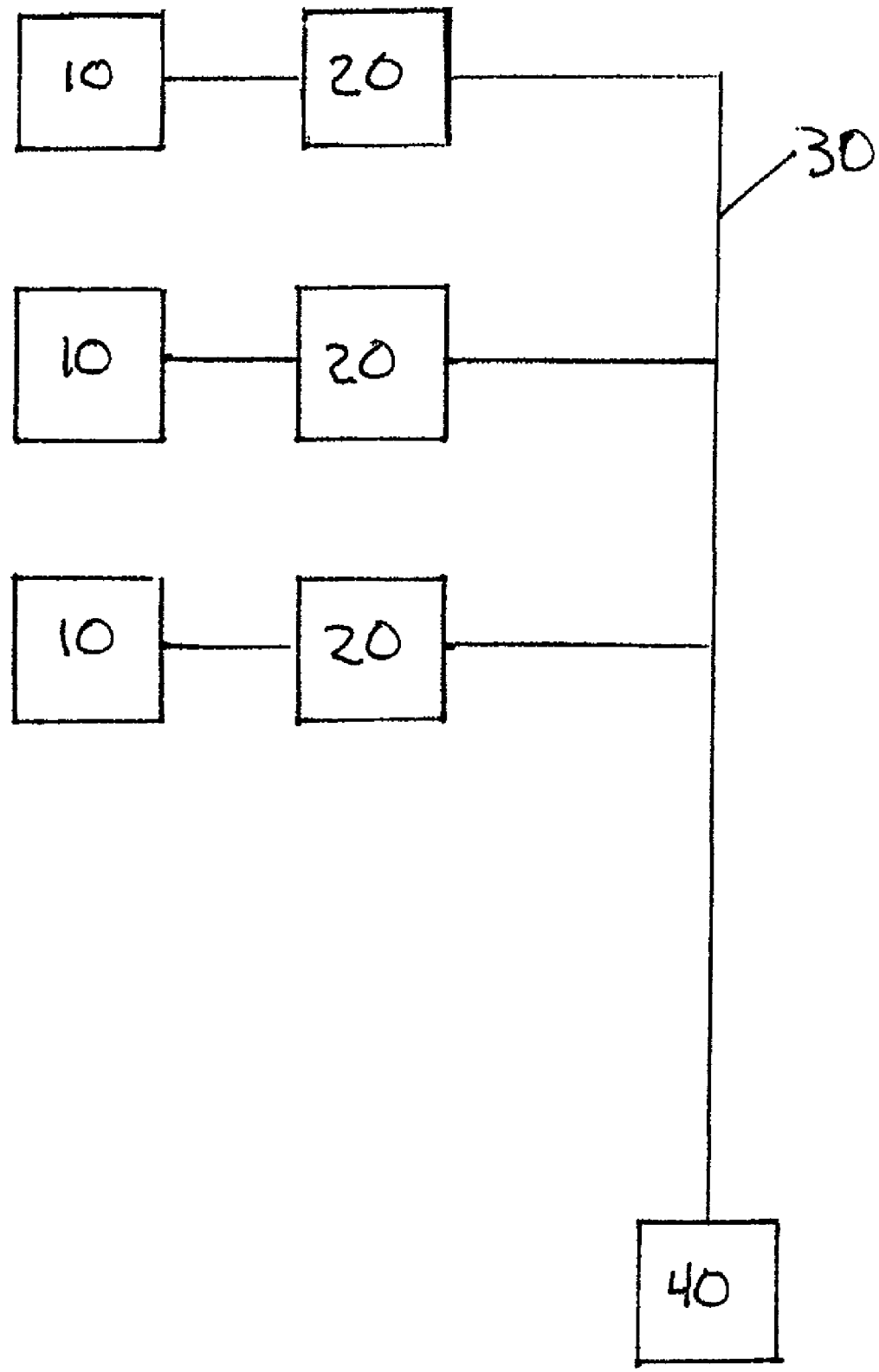

WORKSHOP SYSTEM WITH A PLURALITY OF DIAGNOSTIC AND/OR PROGRAMMING DEVICES NETWORKED BY DATA LINKS FOR VEHICLES

CROSS-REFERENCE TO RELATED APPLICATIONS

This application is a continuation of PCT/EP2007/006837, filed Aug. 2, 2007, which claims priority under 35 U.S.C. §119 to German Application No. 10 2006 038 425.3, filed Aug. 17, 2006, the disclosure of which is expressly incorporated by reference herein.

BACKGROUND AND SUMMARY OF THE INVENTION

The invention relates to a workshop system with a plurality of diagnostic and/or programming devices, which are networked by data links and are intended for vehicles.

Modern diagnostic and programming devices in vehicle workshops operate totally self-sufficiently and independently of the rest of the systems in a workshop. The known diagnostic and programming device, which communicates with the vehicle concerned, locally runs a service application, for example, diagnostic testing or programming of one or more control units. Especially the programming of one or more control units of the vehicle can take a relatively long period of time, during which the workshop employee does not always have to be present.

If one of the diagnostic and programming devices experiences an event, to which the responsible workshop employee has to react, this reaction cannot take place until the next time the workshop employee checks again the progress of the process steps to be carried out. If these events are not critical, such as the confirmation for carrying out the next substep, then in this case (only) the total duration of the process is increased. If, however, the event is critical, such as falling below the lower limit of the energy required to operate the diagnostic and programming device or one of its components, for example, in the case of the battery of a tablet PC, or such as reaching a critical energy level in a vehicle, then a real time reaction to these events would not be possible. The result of not reacting could be—depending on the interrupted substep, especially while programming one or more control units of the vehicle—a defective control unit, which in turn could lead to a higher economic loss.

Therefore, the object of the present invention is to enhance the reliability of workshop systems of the prior art.

One important aspect of the invention consists of configuring, according to the invention, the workshop system of the prior art in such a manner that, on the one hand, when a diagnostic and/or programming device for a vehicle is operating, the permanent presence of a workshop employee is unnecessary, and, on the other hand, a loss owing to the absence of an intervention on the occurrence of an event, which requires that action be taken as soon as possible, is circumvented. In the workshop system of the invention the workshop employee can already begin to work on the next diagnostic and/or programming device, which is connected to another vehicle, when the diagnostic and/or programming operation is still running at the other device. If an event occurs, which demands that the workshop employee take action at short notice, said employee is (also) informed of this need at the other diagnostic and/or programming device. Preferably it is the diagnostic and/or programming device, at which the employee was last working.

The workshop system of the invention is characterized with respect to systems of the prior art by a higher productivity and by the fact that faults can be selectively remedied. Since the diagnostic and programming devices (at least in the workshops of the applicant) are already connected together by an Ethernet network and can communicate with each other over the Ethernet network, the cost of implementing a workshop system, according to the invention, on the basis of a workshop system of the prior art is relatively low; it needs, in particular, suitable software.

Other objects, advantages and novel features of the present invention will become apparent from the following detailed description of the invention when considered in conjunction with the accompanying drawing.

BRIEF DESCRIPTION OF THE DRAWING

The figure shows a schematic illustration of a workshop system in accordance with an embodiment of the present invention.

DETAILED DESCRIPTION

One embodiment of the invention provides that when the power supply voltage of the diagnostic and/or programming device 20 and/or the vehicle electrical system of the vehicle 10 in question drops too low, a warning to this effect is produced (in this embodiment, transmitted over network 30 to alert the user at a remote location 40). In such a case a reliable diagnosis or programming of the control units of the vehicle no longer exists, and expensive control units may even get into a state in which they are permanently no longer programmable even after an increase in the power supply voltage. A drop in the power supply voltage at the diagnostic and/or programming device may occur especially if said device is supplied with voltage by a battery, and this battery discharges in the course of the operation, as is the case, in particular, with a tablet PC.

A preferred embodiment of the invention produces a warning on another diagnostic and/or programming device or all diagnostic and/or programming devices only if it concerns an event exhibiting a high urgency for intervention.

Similarly a preferred embodiment of the invention provides that in the case of a less urgent warning the warning is outputted initially at the diagnostic and/or programming device concerned and only with the passage of time and/or increase in urgency is the warning outputted on another diagnostic and/or programming device or all diagnostic and/or programming devices, if there has been no intervention yet on the part of the workshop employee.

The aforementioned measures avert unnecessary distractions of the workshop employee.

In another preferred embodiment of the invention the workshop system gives information as to: on which diagnostic and/or programming device the workshop employee in question is currently working and/or was last working. In this way unnecessary distractions of other workshop employees can be avoided, and a warning at a moment's notice is sent to the responsible workshop employee.

If the workshop employee in question is not working or has not been working for a prolonged period of time at one of the devices, a preferred embodiment of the invention provides that the warning is forwarded to another workshop employee who is currently working in the workshop system and/or at a device of the system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A workshop system comprising:
a plurality of diagnostic and/or programming devices networked by data links,
wherein the plurality of diagnostic and/or programming devices are programmed to generate a warning indicating the occurrence of an event which requires that a workshop employee intervene at a first diagnostic and/or programming device of the plurality of networked devices, at least the first diagnostic and/or programming device being programmed to autonomously forward the warning to a second diagnostic and/or programming device of the plurality of networked devices for communication to the workshop employee.

2. The workshop system as claimed in claim 1, wherein the event is the undershooting of a power supply voltage of the first diagnostic and/or programming device.

3. The workshop system as claimed in claim 1, wherein the event is an undershooting of a power supply voltage of a vehicle electrical system of a vehicle that is being tested and/or programmed by the first diagnostic and/or programming device.

4. The workshop system as claimed in claim 1, wherein the event is the undershooting of a programming voltage of at least one control unit of a vehicle that is being tested and/or programmed by the first diagnostic and/or programming device.

5. The workshop system as claimed in claim 1, wherein at least the first diagnostic and/or programming device is programmed to output the warning to all of the plurality of diagnostic and/or programming devices when the warning concerns an event having a high urgency for workshop employee intervention.

6. The workshop system as claimed claim 1, wherein at least the first diagnostic and/or programming device is programmed to present the warning initially only to the first diagnostic and/or programming device when the warning concerns an event having an urgency for workshop employee intervention which is lower than a first predetermined level of urgency, and then after a predetermined period of time if an intervention has not occurred, to forward the warning to one or more of the other of the plurality of devices.

7. The workshop system, as claimed in claim 6, wherein the number of the plurality of devices to which the warning is sent increases as time progresses if there has been no intervention.

8. The workshop system as claimed in claim 1, wherein the workshop employee is a first workshop employee, the workshop system is programmed to forward the warning to the diagnostic an/or programming device wherein the workshop employee was last working or is currently working.

9. The workshop system as claimed in claim 8, wherein the workshop system the workshop system is programmed to forward the warning to the diagnostic and/or programming device associated with a second workshop employee.

10. The workshop system as claimed in claim 9, wherein the warning is not forwarded to the diagnostic and/or programming device associated with the second workshop employee until a predetermined period of time has passed without an intervention by the first workshop employee or the event has an urgency which is higher than a second predetermined level of urgency.

11. The workshop system as claimed in claim 10, wherein the second predetermined level of urgency is a level of urgency associated with an expectation that in the absence of short-term intervention, vehicle or component damage is likely to result.

* * * * *